US008577372B2

(12) United States Patent
Inumaru

(10) Patent No.: US 8,577,372 B2
(45) Date of Patent: Nov. 5, 2013

(54) MOBILITY CONTROL SYSTEMS AND MOBILITY CONTROL METHODS

(75) Inventor: Tadayoshi Inumaru, Tokyo (JP)

(73) Assignee: NEC Corporation, Tokyo (JP)

( * ) Notice: Subject to any disclaimer, the term of this patent is extended or adjusted under 35 U.S.C. 154(b) by 74 days.

(21) Appl. No.: 13/132,480

(22) PCT Filed: Dec. 15, 2009

(86) PCT No.: PCT/JP2009/070891
§ 371 (c)(1),
(2), (4) Date: Jun. 2, 2011

(87) PCT Pub. No.: WO2010/071126
PCT Pub. Date: Jun. 24, 2010

(65) Prior Publication Data
US 2011/0244862 A1    Oct. 6, 2011

(30) Foreign Application Priority Data

Dec. 16, 2008  (JP) ................................. 2008-319651

(51) Int. Cl.
*H04W 36/00* (2009.01)
(52) U.S. Cl.
USPC ........................................ 455/436; 370/331
(58) Field of Classification Search
USPC .................. 455/436, 442, 404.2, 437, 456.1; 370/331
See application file for complete search history.

(56) References Cited

U.S. PATENT DOCUMENTS

2007/0270149 A1    11/2007    Yanagihara

FOREIGN PATENT DOCUMENTS

| CN | 1592433 A | 3/2005 |
|---|---|---|
| CN | 101184331 A | 5/2008 |
| CN | 101217819 A | 7/2008 |
| JP | 1997307939 A | 11/1997 |
| JP | 1999341543 A | 12/1999 |
| JP | 2000102055 A | 4/2000 |
| JP | 2000253438 A | 9/2000 |
| JP | 2001218244 A | 8/2001 |
| JP | 2003174673 A | 6/2003 |
| JP | 2004304280 A | 10/2004 |
| JP | 2005012429 A | 1/2005 |
| JP | 2007006089 A | 1/2007 |
| JP | 2007013463 A | 1/2007 |
| JP | 2007312171 A | 11/2007 |
| JP | 2008006074 A | 1/2008 |
| JP | 2008011178 A | 1/2008 |
| WO | 2007125593 A | 11/2007 |

OTHER PUBLICATIONS

Japanese Office Action for JP2010-542972 mailed on Oct. 23, 2012.
International Search Report for PCT/JP2009/070891 mailed Mar. 23, 2010.
Japanese Office Action for JP2010-542972 mailed on Aug. 21, 2012.
Chinese Office Action for CN Application No. 200980150548.1 issued on Jul. 1, 2013 with English Translation.

*Primary Examiner* — Sam Bhattacharya

(57) ABSTRACT

Base stations notify the mobile terminal of area information that represents communication areas; a mobile terminal decides a handover destination base station based on position information of the mobile terminal and the area information concerning which the base stations notify the mobile terminal and transmits a handover request to the base station; the base stations request a base station with which the mobile terminal is communicating for communication information of the mobile terminal if the base stations receive the handover request that the mobile terminal transmits; the base stations notify a base station of the communication information of the mobile terminal if the base stations are requested for the communication information of the mobile terminal; and the base stations perform a handover process for the mobile terminal based on the communication information if the base stations acquire the communication information concerning which the base station notifies the base stations of the communication information of the mobile terminal.

9 Claims, 3 Drawing Sheets

MOBILITY CONTROL SYSTEMS AND MOBILITY CONTROL METHODS

The present application is the National Phase of PCT/JP2009/070891, filed Dec. 15, 2009, which claims priority based on Japanese Patent Application JP 2008-319651 filed on Dec. 16, 2008, the entire contents of which are incorporated herein by reference in its entirety.

TECHNICAL FIELD

The present invention relates to mobility communication systems and mobility control methods that allow the communication state of a terminal that is communicating to be maintained when it is moving between cells in a communication system that structures one mobile communication area composed of a plurality of cells corresponding to a plurality of base stations like an LTE (Long Term Evolution) system.

BACKGROUND ART

In the LTE system, a handover control that maintains the communication state of a terminal that is communicating when it is moving between cells of base stations has been contemplated and defined in specifications [TS36.300 v.8.30].

However, in this control system, since the network side initiatively starts the handover control, the communication state of the terminal may not be reflected in real time. Thus, to assure the real time reflection of the communication state of the terminal, it is contemplated that the frequency of measurement should be increased. Moreover, in the LTE system, in consideration of the case in which a handover to a destination cell (base station) that is designated by the network side fails, a method that provides a plurality of cells as handover destination candidates has been proposed. In this proposed method, if a handover fails, by performing a reconnection process for a cell provided as a handover destination candidate, the communication state of the terminal can be maintained.

On the other hand, JP2007-6089A discloses a technique that causes a terminal to initiatively to be handed over based on received radio wave states of access points of a plurality of base stations.

Moreover, JP2007-13463A discloses a technique in which a superior station determines a handover process based on measurement information received from the terminal and the station notifies the terminal of the command message so as to execute hand over.

SUMMARY OF THE INVENTION

Problem to be Solved by the Invention

However, the method in which the real time that is expressed reflection is satisfied by increasing the measurement frequency and the method in which a plurality of handover destination candidate cells are provided in consideration of a handover failure may result in an increase of the load imposed on network equipment and network resource. Moreover, the method in which a plurality of handover destination candidate cells are provided in consideration of a handover failure may allow the communication state to be maintained if a cell for which a reconnection process is performed is one that is provided as an handover destination candidate; however, if a cell that is not provided for a handover destination candidate is accessed, since call release takes place, a handover failure may result depending on the cell that the terminal selects.

The present invention is made from the point of view of problems involved in the above-presented techniques and an object of the present invention is to provide mobility control systems and mobility control methods that allow the communication state of a terminal to be expressed in real time, the load imposed on the network side to be alleviated, and the communication state to be maintained even if that terminal that is communicating moves between cells.

Means that Solve the Problem

To accomplish the above-presented object, the present invention is a mobility control system having a mobile terminal and a plurality of base stations that can communicate with the mobile terminal and that performs handover control for said mobile terminal that is moving between communication areas of said plurality of base stations, wherein said base stations comprise:

area information notification means that notifies said mobile terminal of area information that represents the communication areas of said plurality of base stations;

terminal information acquisition request means that requests a base station with which the mobile terminal is communicating for communication information of the mobile terminal if the local base station receives a handover request that said mobile terminal transmits;

terminal information acquisition response means that notifies the base station of the communication information of said mobile terminal if the communication information of said mobile terminal is requested; and handover process means that performs a handover process for the mobile terminal based on the communication information if the local base station acquires the communication information of the mobile terminal which said terminal information acquisition response means notifies to the local base station, and wherein said mobile terminal comprises:

base station setting means that decides a handover destination base station based on the position information of said mobile terminal and the area information concerning which said area information notification means notifies said mobile terminal and transmits said handover request to the base station.

In addition, the present invention is a mobility control method for a communication system having a mobile terminal and a plurality of base stations that can communicate with the mobile terminal, said mobility control method performing handover control for said mobile terminal that is moving between communication areas of said plurality of base stations, said mobility control method comprising:

a step that causes said base stations to notify said mobile terminal of area information that represents the communication areas of said plurality of base stations;

a step that causes said mobile terminal to decide a handover destination base station based on position information of the mobile terminal and the area information concerning which said base stations notify said mobile terminal and transmits said handover request to the base station;

a step that causes said base stations to request a base station with which the mobile terminal is communicating for communication information of the mobile terminal if said base stations receive the handover request that said mobile terminal transmits;

a step that causes said base stations to notify a base station of the communication information of the mobile terminal if said base stations are requested for the communication information of said mobile terminal; and a step that cause said base stations to perform a handover process for the mobile terminal based on the communication information if said base stations acquire the communication information concerning which the base station notifies said base stations of the communication information of the mobile terminal.

Effect of the Invention

Since the present invention is structured as described above, the communication state of a terminal can be expressed in real time, the load imposed on the network side can be alleviated, the communication state of the terminal that is communicating can be maintained even if it moves between cells, and radio resource use efficiency can be improved.

BEST MODES THAT CARRY OUT THE INVENTION

In the following, with reference to drawings, embodiments of the present invention will be described.

Figure 1:
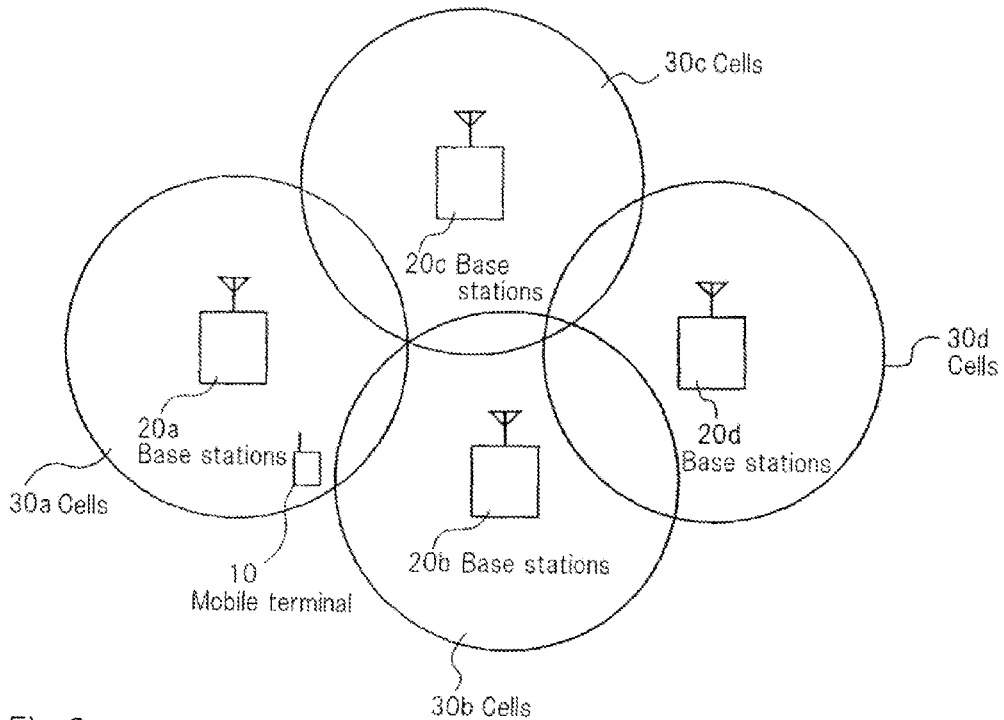
FIG. 1 is a schematic diagram showing an embodiment of a communication system to which a mobility control system according to the present invention is applied.
Figure 2:
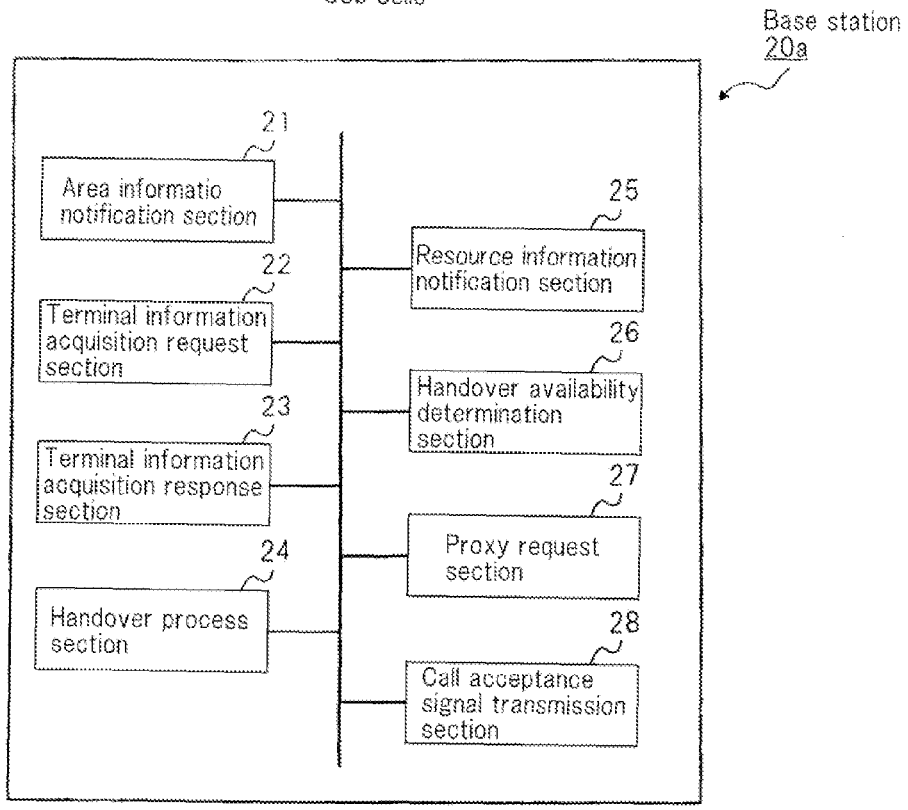
FIG. 2 is a block diagram showing a structure of a base station shown in FIG. 1.
Figure 3:
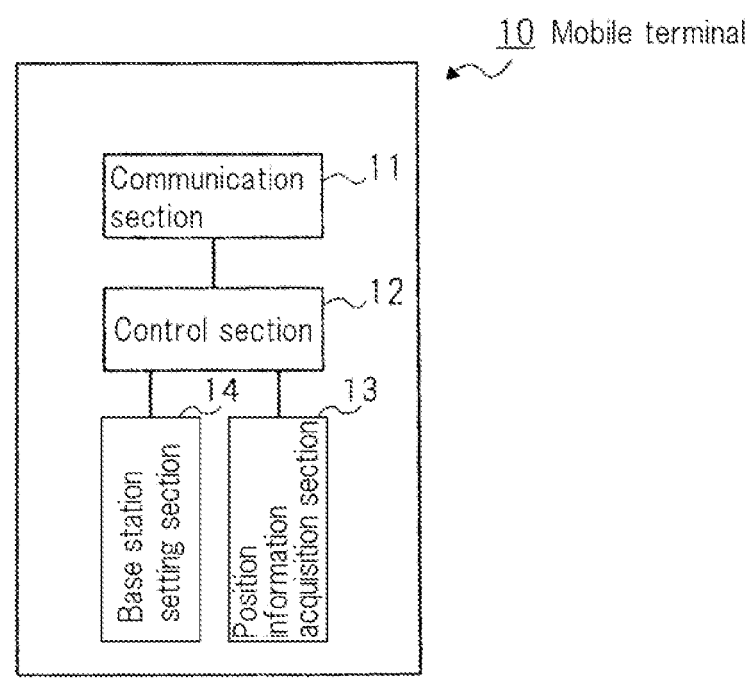
FIG. 3 is a block diagram showing a structure of a mobile terminal shown in FIG. 1.

FIG. 1 is a schematic diagram showing an embodiment of a communication system to which a mobility control system according to the present invention is applied. On the other hand, FIG. 2 is a block diagram showing a structure of base station 20*a* shown in FIG. 1; FIG. 3 is a block diagram showing a structure of mobile terminal 10 shown in FIG. 1. It should be noted that base stations 20*b*-20*d* shown in FIG. 1 have the same structure as base station 20*a* shown in FIG. 2.

As shown in FIG. 1, the communication system according to this embodiment is composed of base station 20*a*-20*d* having cells 30*a*-30*d* that become communication areas and mobile terminal 10 that communicates with base station 20*a*-20*d* corresponding to cells 30*a*-30*d* if mobile terminal 10 is present in cells 30*a*-30*d*. Although FIG. 1 shows only one mobile terminal 10, a plurality of mobile terminals are present (not shown). In addition, the numbers of base station 20*a*-20*d* and cells 30*a*-30*d* are not limited to four.

As shown in FIG. 2, base stations 20*a*-20*d* each have area information notification section 21, terminal information request section 22, terminal information acquisition response section 23, handover process section 24, resource information notification section 25, handover availability determination section 26, proxy request section 27, and call acceptance signal transmission section 28.

Area information notification section 21 notifies mobile terminal 10 of area range information that represents cells 30*a*-30*d* that are communication areas of base station 20*a*-20*d*.

If local base station 20*a*-20*d* receives a handover execution request that mobile terminal 10 transmits, terminal information acquisition request section 22 transmits a terminal context acquisition request to a base station with which mobile terminal 10 is currently communicating to request communication information of mobile terminal 10. In addition, if local base station 20*a*-20*d* receives a priority call establishment request that is a response to the call acceptance notification signal that call acceptance signal transmission section 28 transmits from mobile terminal 10, terminal information acquisition request section 22 transmits the terminal context acquisition request to the base station with which mobile terminal 10 is currently communicating to request the communication information of mobile terminal 10.

If local base station 20*a*-20*d* receives the terminal context acquisition request that another base station transmits for the communication information of mobile terminal 10, terminal information acquisition response section 23 transmits a terminal context acquisition response to the base station that has transmitted the terminal context acquisition request so as to notify the base station of the communication information of mobile terminal 10.

If local base station 20*a*-20*d* receives the terminal context acquisition request that another base station transmits and thereby receives the communication information of mobile terminal 10, handover process section 24 performs a handover process based on the communication information.

Resource information notification section 25 notifies mobile terminal 10 of resource information of [local] base station 20*a*-20*d*.

If local base station 20*a*-20*d* receives a handover execution request that mobile terminal 10 transmits, handover availability determination section 26 determines whether or not [local] base station 20*a*-20*d* can become a handover destination for mobile terminal 10 based on the resource states of [local] base station 20*a*-20*d*.

If handover availability determination section 26 determines that [local] base station 20*a*-20*d* cannot become a handover destination for mobile terminal 10, proxy request section 27 multicasts a handover proxy process request to other base stations.

If local base station 20*a*-20*d* receives the handover proxy process request that another base station transmits, call acceptance signal transmission section 28 transmits a call acceptance signal to mobile terminal 10. In addition, call acceptance signal transmission section 28 transmits a call acceptance signal to mobile terminal 10 at a timing corresponding to priority number information designated to each of the plurality of base stations 20*a*-20*d*.

As shown in FIG. 3, mobile terminal 10 has communication section 11, control section 12, position information acquisition section 13, and base station setting section 14.

Communication section 11 communicates with base stations 20*a*-20*d*.

Position information acquisition section 13 is composed of a GPS or the like and acquires position information of mobile terminal 10.

Control section 12 computes a moving direction vector of mobile terminal 10 based on the history of the position information of mobile terminal 10 acquired by position information acquisition section 13.

Base station setting section 14 decides a handover destination base station based on the moving direction vector of mobile terminal 10 computed from the history of the position information of mobile terminal 10 acquired by position information acquisition section 13 and the area range information concerning which base stations 20a-20d notify mobile terminal 10 and base station setting section 14 transmits the handover execution request to the decided base station. In addition, base station setting section 14 also decides a handover destination base station based on the resource information of base stations 20a-20d.

In the following, a mobility control method of the mobility control system structured as presented above will be described.

Figure 4:
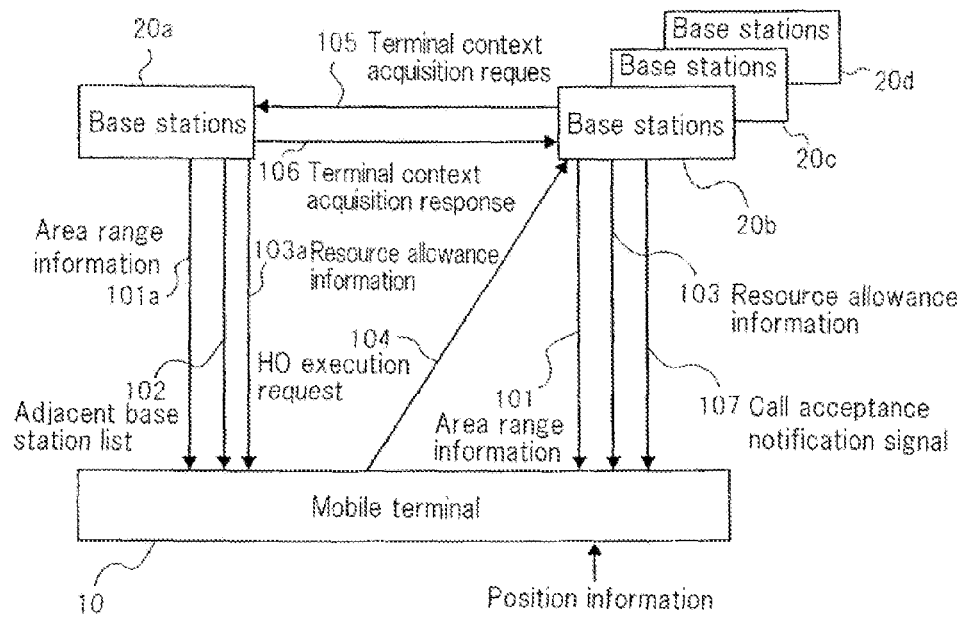
FIG. 4 is a schematic diagram describing a mobility control method of the mobility control system shown in FIG. 1 to FIG. 3.
Figure 5:
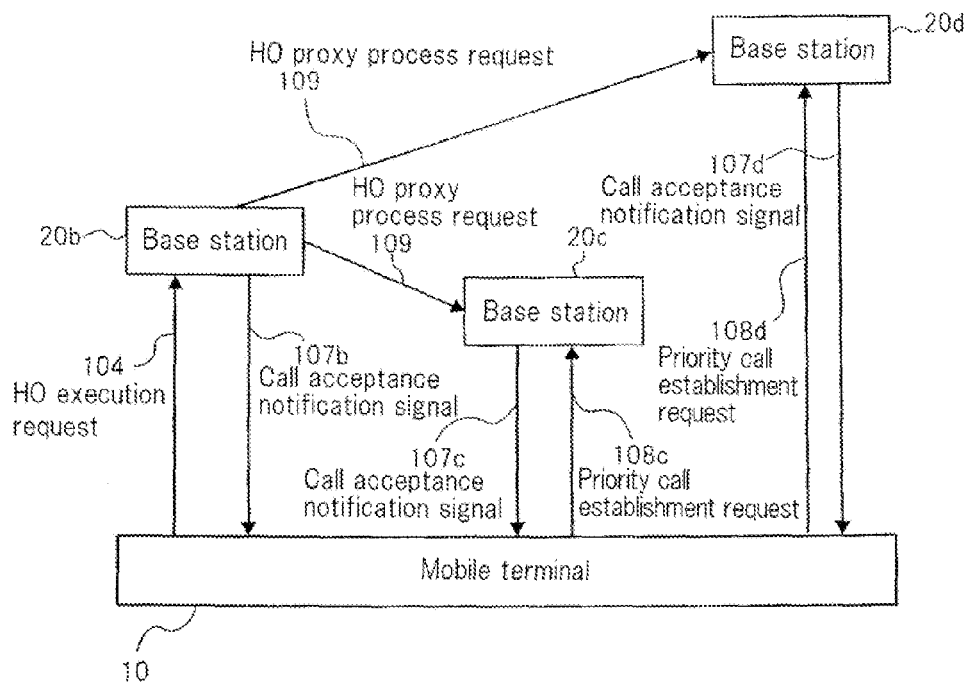
FIG. 5 is a schematic diagram describing the mobility control method of the mobility control system shown in FIG. 1 to FIG. 3.

FIG. 4 and FIG. 5 are schematic diagrams describing the mobility control method of the mobility control system shown in FIG. 1 to FIG. 3. In the following description, the case in which base station 20a is handed over to base station 20b-20d will be presented.

As broadcast information, mobile terminal 10 always acquires area range information 101a of base station 20a and area range information 101 of base station 20a-20d as handover candidates 103 from area information notification section 21 of each of base stations 20a-20d. In addition, mobile terminal 10 acquires resource allowance information 103a of base station 20a and resource allowance information 103 of base stations 20b-20d that are periodically broadcast from resource information notification section 25 on each bearer type basis. Resource allowance information 103, 103a represent the quantity of bearer that can be accepted. In addition, mobile terminal 10 also acquires adjacent base station list 102 that represents base stations to which base station 20a that is providing a service can be handed over.

Mobile terminal 10 checks whether or not handover candidate base stations 20b-20d that are transmitting a reference signal exceeding a particular threshold are contained in adjacent base station list 102.

Area range information 101, 101a contain position information of where base stations 20a-20d are located and service provision available ranges of base stations 20a-20d. In mobile terminal 10, control section 12 computes the moving direction vector of mobile terminal 10 based on the history of the position information of mobile terminal 10 acquired by position information acquisition section 13, and base station setting section 14 determines whether or not mobile terminal 10 will likely exit from the service provision available ranges in a particular period of time. If mobile terminal 10 is likely to exit from the service provision available ranges, base station setting section 14 selects handover candidate base stations 20b-20d that are not likely to exit from the service provision available ranges in the particular period of time based on the direction vector computed from the history of the position information of mobile terminal 10 and resource allowance information 107 and starts handing over the mobile terminal to a base station that has the optimum condition.

Mobile terminal 10 whose base station setting section 14 has decided to start handing over mobile terminal 10 transmits handover execution request 104 to a handover destination base station having the optimum condition (base station 20b in FIG. 1) and tries to receive call acceptance notification 107 from base station 20b-20d. This handover execution request 104 contains an identifier of base station 20a that provided a cell in which mobile terminal 10 was present, identifiers of handover candidate base stations (base stations 20c, 20d in FIG. 1) other than handover destination base station (base station 20b in FIG. 1), and an identifier of mobile terminal 10.

When base station 20b receives handover execution request 104 from mobile terminal 10, handover availability determination section 26 checks whether base station 20b can accept a call from mobile terminal 10.

If the call from mobile terminal 10 is acceptable, while call acceptance signal transmission section 28 transmits call acceptance notification 107, terminal information acquisition request section 22 transmits terminal context acquisition request 105 to base station 20a so as to acquire context that is communication information about mobile terminal 10.

If the call from mobile terminal 10 is not acceptable, proxy request section 27 multicasts handover proxy process request 109 to the handover candidate base stations. Handover proxy process request 109 contains the identifier of base station 20a that provided the cell in which mobile terminal 10 was present and the identifier of mobile terminal 10. In addition, handover proxy process request 109 contains handover execution priority number information that has been designated for each of the handover candidate base stations. When base stations 20c, 20d receive handover proxy process request 109, handover availability determination section 26 checks whether or not the local base station can accept a call from mobile terminal 10. If acceptable, call acceptance signal transmission section 28 transmits call acceptance notification signals 107c, 107d at timings according to the priority number information. When mobile terminal 10 receives call acceptance notification signals 107c, 107d, mobile terminal 10 transmits priority call establishment requests 108c, 108d to base stations 20c, 20d so as to establish a call.

When base station 20c receives priority call establishment request 108c or base station 20d receives priority call establishment request 108d, terminal information acquisition request section 22 transmits terminal context acquisition request 105 to base station 20a so as to acquire context about mobile terminal 10. Since mobile terminal 10 transmits priority call establishment request 108c, 108d to one of the base stations, mobile terminal 10 transmits terminal context acquisition request 105 to one of base stations 20c, 20d.

In base station 20a, terminal information acquisition response section 23 transmits terminal context acquisition response 106 to base stations 20b-20d that have transmitted terminal context acquisition request 105 and notifies base stations 20b-20d of context of mobile terminal 10. Since this context information contains bearer information used on the network side for mobile terminal 10, the connection and bearer for mobile terminal 10 can be maintained without it being necessity to disconnect the call and release the bearer.

When base stations 20b-20d receive terminal context acquisition response 106, handover process section 24 performs a handover process for mobile terminal 10.

In the present invention, the processes performed in each of the base stations can be accomplished not only by the above-presented dedicated hardware, but also by recording a program that carries out the function to a record medium from which each of the base stations can read, causing each of the base stations to read the program from the record medium, and causing each of the base stations to execute the program. Examples of record mediums from which each of the base stations can read the program are movable record mediums such as floppy disk, magneto-optical disc, DVD, and CD, HDD built in projectors, and so forth. The program recorded on the record medium is read, for example, by the control block and the same processes as the above-presented processes are performed.

In the foregoing, with reference to the embodiments, the present invention has been described. However, it should be understood by those skilled in the art that the structure and details of the present invention may be changed in various manners without departing from the scope of the present invention.

The invention claimed is:

1. A mobility control system having a mobile terminal and a plurality of base stations that can communicate with the mobile terminal and the mobility control system performs a handover control for said mobile terminal that is moving between communication areas of said plurality of base stations, wherein said base stations comprise:

area information notification means that notifies said mobile terminal of area information that represents the communication areas of said plurality of base stations;

terminal information acquisition request means that requests a base station with which the mobile terminal is communicating for communication information of the mobile terminal if the local base station receives a handover request that said mobile terminal transmits;

terminal information acquisition response means that notifies the base station of the communication information of said mobile terminal if the communication information of said mobile terminal is requested; and handover process means that performs a handover process for the mobile terminal based on the communication information if the local base station acquires the communication information of the mobile terminal which said terminal information acquisition response means notifies to the local base station, and wherein said mobile terminal comprises:

base station setting means that decides a handover destination base station based on the position information of said mobile terminal and the area information concerning which said area information notification means notifies said mobile terminal and transmits said handover request to the base station.

2. The mobility control system as set forth in claim 1, wherein said base stations have resource information notification means that notifies said mobile terminal of resource information of the local base station, and wherein said base station setting means decides a handover destination base station based on the position information of the mobile terminal, the area information concerning which said area information notification means notifies said mobile terminal, and the resource information concerning which said resource information notification means notifies said mobile terminal.

3. The mobility control system as set forth in claim 1, wherein said base stations comprise:

handover availability determination means that determines whether or not the local base station can become a handover destination base station for the mobile terminal based on the resource state of the local base station if the local base station receives a handover request that said mobile terminal transmits;

proxy request means that transmits a handover proxy process request to another base station if said handover availability determination means determines that the local base station cannot become a handover destination for said mobile terminal; and call acceptance signal transmission means that transmits a call acceptance signal to the mobile terminal if the local base station receives the handover proxy process request that said proxy request means transmits, and wherein said terminal information acquisition request means requests a base station with which said mobile terminal is currently communicating for the communication information of the mobile terminal if the local base station receives a response to the call acceptance signal that said call acceptance signal transmission means transmits from said mobile terminal.

4. The mobility control system as set forth in claim 3, wherein said call acceptance signal transmission means transmits the call acceptance signal to said mobile terminal at a timing corresponding to priority number information designated for each of the plurality of base stations, the call acceptance signal being contained in said handover proxy process request.

5. A mobility control method for a communication system having a mobile terminal and a plurality of base stations that can communicate with the mobile terminal, said mobility control method performing a handover control for said mobile terminal that is moving between communication areas of said plurality of base stations, said mobility control method comprising:

a step that causes said base stations to notify said mobile terminal of area information that represents the communication areas of said plurality of base stations;

a step that causes said mobile terminal to decide a handover destination base station based on position information of the mobile terminal and the area information concerning which said base stations notify said mobile terminal and transmits said handover request to the base station;

a step that causes said base stations to request a base station with which the mobile terminal is communicating for communication information of the mobile terminal if said base stations receive the handover request that said mobile terminal transmits;

a step that causes said base stations to notify a base station of the communication information of the mobile terminal if said base stations are requested for the communication information of said mobile terminal; and a step that causes said base stations to perform a handover process for the mobile terminal based on the communication information if said base stations acquire the communication information concerning which the base station notifies said base stations of the communication information of the mobile terminal.

6. The mobility control method as set forth in claim 5, comprising:

a step that causes said base stations to notify said mobile terminal of resource information of the local base stations, and wherein said mobile terminal decides a handover destination base station based on the position information of the mobile terminal, area information concerning which said base stations notify said mobile terminal, and the resource information concerning which said resource information notification means notifies the mobile terminal.

7. The mobility control method as set forth in claim 5, comprising:

a step that causes said base stations to determine whether or not said base stations can become a handover destination for said mobile terminal based on the resource state of the base stations if the base stations receive a handover request that said mobile terminal transmits;

a step that causes said base stations to transmit a handover proxy process request to another base station if the base stations determine that the base stations cannot become a handover destination for said mobile terminal;

a step that causes said base stations to transmit a call acceptance signal to the mobile terminal if the base stations receive said handover proxy process request; and a step that causes said base station to request a base station concerning which the mobile terminal is currently communicating for the communication information of the mobile terminal if said base stations receive a response to said call acceptance signal.

8. The mobility control method as set forth in claim 7, wherein said base stations transmit the call acceptance signal to said mobile terminal at timings corresponding to priority number information designated for the plurality of base stations, the call acceptance signal being contained in said handover proxy process request.

9. A non-transitory record medium storing a program for a mobility control system having a mobile terminal and a plurality of base stations that can communicate with the mobile terminal, said program performing a handover control for said mobile terminal that is moving between communication areas of said plurality of base stations, said program causing said base stations to execute procedures comprising:

a procedure that notifies said mobile terminal of area information that represents the communication areas of said plurality of base stations;

a procedure that requests a base station with which the mobile terminal is communicating for communication information of the mobile terminal if said base station receives a handover request that said mobile terminal transmits;

a procedure that notifies a base station of the communication information of the mobile terminal if the base station requests the communication information of the mobile terminal; and a procedure that performs a handover process for the mobile terminal based on the communication information if said base stations acquire the communication information concerning which said base stations notify the mobile terminal.

* * * * *